(12) United States Patent
Manolakis et al.

(10) Patent No.: US 12,436,224 B2
(45) Date of Patent: Oct. 7, 2025

(54) LOCATION CALCULATION

(71) Applicant: Nokia Technologies Oy, Espoo (FI)

(72) Inventors: Konstantinos Manolakis, Munich (DE); Tzu-Chung Hsieh, Hoffman Estates, IL (US); Frank Frederiksen, Klarup (DK); Jeroen Wigard, Klarup (DK); Rafhael Medeiros De Amorim, Aalborg (DK)

(73) Assignee: NOKIA TECHNOLOGIES OY, Espoo (FI)

( * ) Notice: Subject to any disclaimer, the term of this patent is extended or adjusted under 35 U.S.C. 154(b) by 382 days.

(21) Appl. No.: 18/123,579

(22) Filed: Mar. 20, 2023

(65) Prior Publication Data
US 2023/0296720 A1  Sep. 21, 2023

(30) Foreign Application Priority Data
Mar. 21, 2022 (EP) ..................................... 22163163

(51) Int. Cl.
*G01S 5/02* (2010.01)
*G01S 5/14* (2006.01)
(Continued)

(52) U.S. Cl.
CPC .............. *G01S 5/0249* (2020.05); *G01S 5/14* (2013.01); *H04B 7/18513* (2013.01); *H04W 64/00* (2013.01)

(58) Field of Classification Search
CPC ..... G01S 5/0249; G01S 5/14; H04B 7/18513; H04B 7/18563; H04W 64/00; H04W 56/0045
See application file for complete search history.

(56) References Cited

U.S. PATENT DOCUMENTS

| 12,192,938 B2* | 1/2025 | Ryu ..................... H04B 7/0626 |
| 2021/0281520 A1 | 9/2021 | Shrestha et al. |

(Continued)

FOREIGN PATENT DOCUMENTS

| WO | WO 2020/204421 A1 | 10/2020 |
| WO | WO 2021/062666 A1 | 4/2021 |
| WO | WO 2021/164703 A1 | 8/2021 |

OTHER PUBLICATIONS

EESR (EP22163163.3) Sep. 9, 2022, 11 pgs.
(Continued)

*Primary Examiner* — Dhaval V Patel
(74) *Attorney, Agent, or Firm* — Lippes Mathias LLP

(57) ABSTRACT

Aspects and embodiments relate to an apparatus and method for evaluating location of a terrestrial network node in a non-terrestrial network. In particular, one aspect provides an apparatus, comprising means for receiving an indication of propagation delay between a terrestrial network node and a non-terrestrial node in a non-terrestrial wireless communication network; means for receiving an indication of location of the non-terrestrial node; and means for evaluating location of the terrestrial network node in dependence upon the received indication of propagation delay between the terrestrial network node and the non-terrestrial node, and the indication of location of the non-terrestrial node. A further aspect provides a method of evaluating location of a terrestrial network node, and a computer program product operable, when executed on a computer, to perform that method. Aspects and embodiments recognise that having a knowledge of gNB and NTN-GW location in a non-terrestrial network can allow UE to simplify procedures in relation to the updating and tracking of forward link delay. Since it has been agreed that a network will not directly provide the gNB and/or NTN-GW location to UE, due to security and privacy reasons in some countries, apparatus can be configured to
(Continued)

perform methods according to which a UE is operable to calculate or obtain information which can assist its ongoing operation and reduce an ongoing need to decode SIB in support of calculation of an appropriate Uplink timing advance (TA) to apply in relation to communications exchanged with a network.

20 Claims, 3 Drawing Sheets

(51) Int. Cl.
*H04B 7/185* (2006.01)
*H04W 64/00* (2009.01)

(56) References Cited

U.S. PATENT DOCUMENTS

| | | | |
|---|---|---|---|
| 2021/0314892 A1 | 10/2021 | Rico Alvarino et al. | |
| 2022/0232498 A1* | 7/2022 | Muhammad | H04W 36/0088 |
| 2022/0322263 A1* | 10/2022 | Sengupta | H04W 56/004 |
| 2023/0022798 A1* | 1/2023 | Li | H04J 13/0062 |
| 2023/0199685 A1* | 6/2023 | Ghanbarinejad | H04W 72/0446 370/329 |
| 2024/0064851 A1* | 2/2024 | Li | H04B 7/18519 |
| 2024/0114474 A1* | 4/2024 | Rune | H04L 5/0051 |
| 2024/0129872 A1* | 4/2024 | Wong | H04W 56/0045 |

OTHER PUBLICATIONS

Huawei et al "Discussion on UL time and frequency synchronization enhancement for NTN", 3GPP, R1-2106483, 3GPP TSG RAN WG1 Meeting #106, Aug. 16-27, 2021, 9 pgs.
Nokia et al "Further discussion on synchronization aspects for NR over NTN" 3GPP, R1-2109165, 3GPP TSG RAN WG1 #106bis, e-Meeting Oct. 11-19, 2021, 24 pgs.
Fgi et al "UL time and frequency synchronization in NTN", 3GPP, R1-2107288, 3GPP TSG RAN WG1#106-e, e-Meeting Aug. 16-27, 2021, 6 pgs.
Huawei et al "Discussion on UL time and frequency synchronization enhancement for NTN", 3GPP, R1-2007570, 3GPP TSG RAN WG1 Meeting #103-e, e-Meegint, Oct. 26-Nov. 13, 2020, 10 pgs.
Wang, et al. "Location-Based Timing Advance Estimation for 5G Integrated LEO Satellite Communications", IEEE Trans. Of Vehicular Tech. V. 70, N. 6, Jun. 2021.

* cited by examiner

LOCATION CALCULATION

TECHNOLOGICAL FIELD

Various example embodiments relate to an apparatus and method for evaluating location of a terrestrial network node in a non-terrestrial network.

BACKGROUND

A 5th generation mobile network (5G) standard, referred to as 5G New Radio (NR), is being developed in order to provide high capacity, high reliability, and low latency to support wireless communications. The 5G NR standard includes support for use of non-terrestrial network (NTN) nodes, including Low-Earth Orbit (LEO), GEO satellites, unmanned aerial system (UAS), High Altitude Platform System (HAPS) devices, and similar, to provide 5G NR services to users on Earth. In other words, the 5G NR standard recognises that non-terrestrial devices, including devices located on planes, or other flying objects located above the Earth can form part of a radio access network, provide coverage, and support communication within that radio access network.

The 5G NR standard recognises that a NTN may be used to support communication within a wireless communication network with devices of various types, including: personal user devices, and Narrow Band-Internet of Things (NB-IoT) devices and enhanced Machine Type Communication (eMTC) devices.

Various challenges arise as a result of use of NTN devices as RAN nodes in wireless communication systems. In particular, use of an NTN can result in significant signal transmission propagation delay between an NTN node and user equipment (UE) devices. The propagation delay may result from physical distance between an NTN node and a UE device. It is possible that signal transmission propagation delay may span several scheduling slots, and thus result in inter-symbol interference in uplink (UL) transmissions from user equipment to the network. In a terrestrial network, a network access node, for example, a gNB, can correct timing errors in an UL signal from a UE within a cyclic prefix (CP) length by using a timing advance (TA) value to align the UL transmission of UE devices within the coverage area or cell supported by the network access node. However, the large signal transmission propagation delay which can be experienced in UL communications between an NTN node and a UE device is too large to be accommodated by the terrestrial network solution, since the TA value required to correct the timing error in the UL signal between the NTN node and the UE device can be greater than the CP length.

An NTN node may have a large footprint, supporting a large region of radio coverage. As a result, there are likely to be different transmission delays which occur in communication paths to the NTN node in dependence upon location of UE within the footprint of coverage. A common TA value is therefore not appropriate for use in correction of UL timing errors for all UE devices supported by a given NTN node.

Accordingly, an approach is desired that accurately and efficiently determines communication, transmission, and/or signalling offsets between at least one user equipment (UE) device and at least one non-terrestrial network (NTN) node.

BRIEF SUMMARY

The scope of protection sought for various embodiments of the invention is set out by the independent claims. The embodiments, arrangements and features, if any, described in this specification that do not fall under the scope of the independent claims are to be interpreted as examples useful for understanding various claimed embodiments of the invention.

According to various, but not necessarily all, embodiments of the invention there is provided an apparatus, comprising: means for receiving an indication of propagation delay between a terrestrial network node and a non-terrestrial node in a non-terrestrial wireless communication network; means for receiving an indication of location of the non-terrestrial node; means for evaluating location of the terrestrial network node in dependence upon the received indication of propagation delay between the terrestrial network node and the non-terrestrial node, and the indication of location of the non-terrestrial node.

The means for receiving and means for evaluating may comprise circuitry or logic configured to perform the function described in relation to the means.

Receiving may comprise: receiving a broadcast system information block and decoding the system information block to determine an indication of propagation delay between the terrestrial network node and the non-terrestrial node in the non-terrestrial wireless communication network.

The indication of propagation delay between a terrestrial network node and a non-terrestrial node in a non-terrestrial wireless communication network may comprise an indication of a feeder link propagation delay. The indication of propagation delay may comprise an indication of time or an indication of distance or a combination thereof. It will be appreciated that propagation time or delay may be readily related to distance since propagation will typically occur at light speed.

The indication of propagation delay may comprise a common timing advance associated with a feeder link between the terrestrial network node and the non-terrestrial node.

Receiving may comprise: receiving a broadcast system information block and decoding the system information block to determine an indication of location of the non-terrestrial node in the non-terrestrial wireless communication network.

Receiving an indication of location of the non-terrestrial node may comprises receiving ephemeris information associated with the non-terrestrial node.

The apparatus may be configured to evaluate location of the terrestrial network node by comparing the received indication of propagation delay between the terrestrial network node and the non-terrestrial node, with an equivalent calculated expected propagation delay between the terrestrial network node and non-terrestrial node calculated based upon the received indication of location of the non-terrestrial node and one or more stored locations of terrestrial network nodes.

The apparatus may be configured to evaluate location of the terrestrial network node by comparing the received indication of propagation delay between the terrestrial network node and the non-terrestrial node, and the received indication of location of the non-terrestrial node with an equivalent indication of propagation delay between the terrestrial network node and non-terrestrial node calculated based upon the received indication of location of the non-terrestrial node and one or more stored locations of terrestrial network nodes.

The means for receiving the indication of propagation delay between the terrestrial network node and the non-terrestrial node may be configured to receive at least three indications of propagation delay; and the means for receiving the indication of location of the non-terrestrial node may be configured to receive at least three indications of location of the non-terrestrial node which correspond to an associated received indication of propagation delay between the terrestrial network node and the non-terrestrial node.

The means for evaluating location of the terrestrial network node may be configured to calculate the location of the terrestrial network node from the at least three received indications of propagation delay between the terrestrial network node and the non-terrestrial node and the corresponding at least three indications of location of the non-terrestrial node.

The terrestrial network node may comprise a non-terrestrial network gateway co-located with a network base station.

The terrestrial network node may comprise: a non-terrestrial network gateway which is coupled to a network base station remote from the non-terrestrial network gateway.

The apparatus may comprise: means for determining a signal delay between the network base station remote from the non-terrestrial network gateway.

The means for determining the signal delay between the network base station remote from the non-terrestrial network gateway may be configured to receive an indication of that signal delay from the network.

In some embodiments, the indication of propagation delay between the terrestrial network node and the non-terrestrial node comprises an indication of signal delay between the network base station and the non-terrestrial node; and the means for evaluating location of the terrestrial network node in dependence upon the received indication of propagation delay between the terrestrial network node and the non-terrestrial node and the indication of location of the non-terrestrial node is further configured to evaluate the signal delay between the network base station coupled to the non-terrestrial network gateway.

Where the signal delay between the network base station coupled to the non-terrestrial network gateway is to be evaluated, the means for receiving the indication of propagation delay between the terrestrial network node and the non-terrestrial node may be configured to receive at least four indications of propagation delay; and the means for receiving the indication of location of the non-terrestrial node may be configured to receive at least four indications of location of the non-terrestrial node which correspond to an associated received indication of propagation delay between the terrestrial network node and the non-terrestrial node.

The apparatus may comprise means for storing the calculated location of the terrestrial network node. The storage means may comprise local apparatus memory.

The apparatus may comprise means for calculating a terrestrial network node to non-terrestrial node propagation delay based upon the evaluated location of the terrestrial network node and received indication of location of the non-terrestrial node.

The calculated terrestrial network node to non-terrestrial node propagation delay may comprise a calculated indication of common timing advance to be applied.

The apparatus may comprise means for receiving an indication of required timing advance to be applied according to network calculation; and means for comparing the received indication of required timing advance to a local calculation of timing advance based upon the evaluated location of the terrestrial network node.

The comparison may provide an indication of signal delay incurred between the network base station coupled to the non-terrestrial network gateway.

The apparatus may comprise: means for comparing the indication of signal delay between the network base station coupled to the non-terrestrial network gateway received via network signalling with a calculated signal delay between the network base station coupled to the non-terrestrial network gateway based upon evaluated location of the terrestrial network node.

The apparatus may be configured such that if the comparison reveals a difference which exceeds a predetermined threshold, initiation of a recalculation of location the terrestrial network node is triggered.

The apparatus may be configured such that if the comparison reveals a difference which exceeds a predetermined threshold for a predetermined period of time, initiation of a recalculation of location the terrestrial network node is triggered.

The apparatus may comprise user equipment configured to operate within a non-terrestrial network. The apparatus may comprise a Narrow Band-Internet of Things (NB-IoT) device. The apparatus may comprise an enhanced Machine Type Communication (eMTC) device.

The non-terrestrial node may comprise a Low-Earth Orbit (LEO) satellite, GEO satellites, unmanned aerial system (UAS), HAPS device, or similar. The non-terrestrial node may be configured to provide 5G NR services to users on Earth.

The location of the terrestrial network node may comprise an $\{x, y, z\}$ location according to an appropriate coordinate system. The location of the terrestrial network node may comprise in indication of latitude, longitude and elevation according to an appropriate coordinate system.

The indication of location of the non-terrestrial node may comprise an indication of instantaneous position and future position. The indication of location of the non-terrestrial node may comprise an indication of instantaneous position and an indication of speed and direction of the non-terrestrial node.

The apparatus described above may be such that the means comprise: at least one processor; and at least one memory including computer program code, the at least one memory and computer program code being configured to, with the at least one processor, cause the performance of the apparatus.

A further aspect provides an apparatus, comprising:
at least one processor; and at least one memory including computer program code; the at least one memory and the computer program code configured to, with the at least one processor, cause the apparatus at least to perform: receiving an indication of propagation delay between a terrestrial network node and a non-terrestrial node in a non-terrestrial wireless communication network; receiving an indication of location of the non-terrestrial node; and evaluating location of the terrestrial network node in dependence upon the received indication of propagation delay between the terrestrial network node and the non-terrestrial node and the indication of location of the non-terrestrial node.

A further aspect of the invention may provide a method, comprising: receiving an indication of propagation delay between a terrestrial network node and a non-terrestrial node in a non-terrestrial wireless communication network; receiving an indication of location of the non-terrestrial node; and evaluating location of the terrestrial network node in dependence upon the received indication of propagation delay between the terrestrial network node and the non-terrestrial node and the indication of location of the non-terrestrial node.

Receiving may comprise: receiving a broadcast system information block and decoding the system information block to determine an indication of propagation delay between the terrestrial network node and the non-terrestrial node in the non-terrestrial wireless communication network.

The indication of propagation delay between a terrestrial network node and a non-terrestrial node in a non-terrestrial wireless communication network may comprise an indication of a feeder link propagation delay.

The indication of propagation delay may comprise a common timing advance associated with a feeder link between the terrestrial network node and the non-terrestrial node.

Receiving may comprise: receiving a broadcast system information block and decoding the system information block to determine an indication of location of the non-terrestrial node in the non-terrestrial wireless communication network.

Receiving an indication of location of the non-terrestrial node may comprises receiving ephemeris information associated with the non-terrestrial node.

Evaluation of location of the terrestrial network node may comprise comparing the received indication of propagation delay between the terrestrial network node and the non-terrestrial node, and the received indication of location of the non-terrestrial node with an equivalent indication of propagation delay between the terrestrial network node and non-terrestrial node calculated based upon the received indication of location of the non-terrestrial node and one or more stored locations of terrestrial network nodes.

Receiving the indication of propagation delay between the terrestrial network node and the non-terrestrial node may comprise receiving at least three indications of propagation delay; and receiving the indication of location of the non-terrestrial node may comprise receiving at least three indications of location of the non-terrestrial node which correspond to an associated received indication of propagation delay between the terrestrial network node and the non-terrestrial node.

Evaluating location of the terrestrial network node may comprise calculating the location of the terrestrial network node from the at least three received indications of propagation delay between the terrestrial network node and the non-terrestrial node and the corresponding at least three indications of location of the non-terrestrial node.

The terrestrial network node may comprise a non-terrestrial network gateway co-located with a network base station.

The terrestrial network node may comprise: a non-terrestrial network gateway which is coupled to a network base station remote from the non-terrestrial network gateway.

The method may comprise: determining a signal delay between the network base station remote from the non-terrestrial network gateway.

Determining the signal delay between the network base station remote from the non-terrestrial network gateway may comprise receiving an indication of that signal delay from the network.

In some embodiments, the indication of propagation delay between the terrestrial network node and the non-terrestrial node comprises an indication of propagation delay between the network base station and the non-terrestrial node; and evaluating location of the terrestrial network node in dependence upon the received indication of propagation delay between the terrestrial network node and the non-terrestrial node and the indication of location of the non-terrestrial node comprises also evaluating the signal delay between the network base station coupled to the non-terrestrial network gateway.

Where the signal delay between the network base station coupled to the non-terrestrial network gateway is to be evaluated, receiving the indication of propagation delay between the terrestrial network node and the non-terrestrial node may comprise receiving at least four indications of propagation delay; and receiving at least four indications of location of the non-terrestrial node which correspond to an associated received indication of propagation delay between the terrestrial network node and the non-terrestrial node.

The method may comprise: storing the calculated location of the terrestrial network node. The method may comprise storing in local apparatus memory.

The method may comprise calculating a terrestrial network node to non-terrestrial node propagation delay based upon the evaluated location of the terrestrial network node and received indication of location of the non-terrestrial node.

The calculated terrestrial network node to non-terrestrial node propagation delay may comprise a calculated indication of common timing advance to be applied.

The method may comprise receiving an indication of required timing advance to be applied according to network calculation; and comparing the received indication of required timing advance to a local calculation of timing advance based upon the evaluated location of the terrestrial network node.

The comparison may provide an indication of signal delay incurred between the network base station coupled to the non-terrestrial network gateway.

The method may comprise comparing the indication of signal delay between the network base station coupled to the non-terrestrial network gateway received via network signalling with a calculated signal delay between the network base station coupled to the non-terrestrial network gateway based upon evaluated location of the terrestrial network node.

The method may be such that if the comparison reveals a difference which exceeds a predetermined threshold, initiation of a recalculation of location the terrestrial network node is triggered.

The method may be such that if the comparison reveals a difference which exceeds a predetermined threshold for a predetermined period of time, initiation of a recalculation of location the terrestrial network node is triggered.

The location of the terrestrial network node may comprise an $\{x, y, z\}$ location according to an appropriate coordinate system. The location of the terrestrial network node may comprise in indication of latitude, longitude and elevation according to an appropriate coordinate system.

The indication of location of the non-terrestrial node may comprise an indication of instantaneous position and future position. The indication of location of the non-terrestrial node may comprise an indication of instantaneous position and an indication of speed and direction of the non-terrestrial node.

A further aspect provides a computer program product configured such that, when executed on a computer, it performs the method described above.

Further particular and preferred aspects are set out in the accompanying independent and dependent claims. Features of the dependent claims may be combined with features of the independent claims as appropriate, and in combinations other than those explicitly set out in the claims.

Where an apparatus feature is described as being operable to provide a function, it will be appreciated that this includes an apparatus feature which provides that function or which is adapted or configured to provide that function.

BRIEF DESCRIPTION

Some example embodiments will now be described with reference to the accompanying drawings in which:

FIG. 1. illustrates schematically some main components of a typical Non-Terrestrial Network (NTN);

DETAILED DESCRIPTION

Before discussing the example embodiments in any more detail, first an overview will be provided. The description is based on NR over NTN but is equally valid for supporting NTN communication with Narrow Band-Internet of Things (NB-IoT) and enhanced Machine Type Communication (eMTC).

Non-Terrestrial Networks

Figure 1:
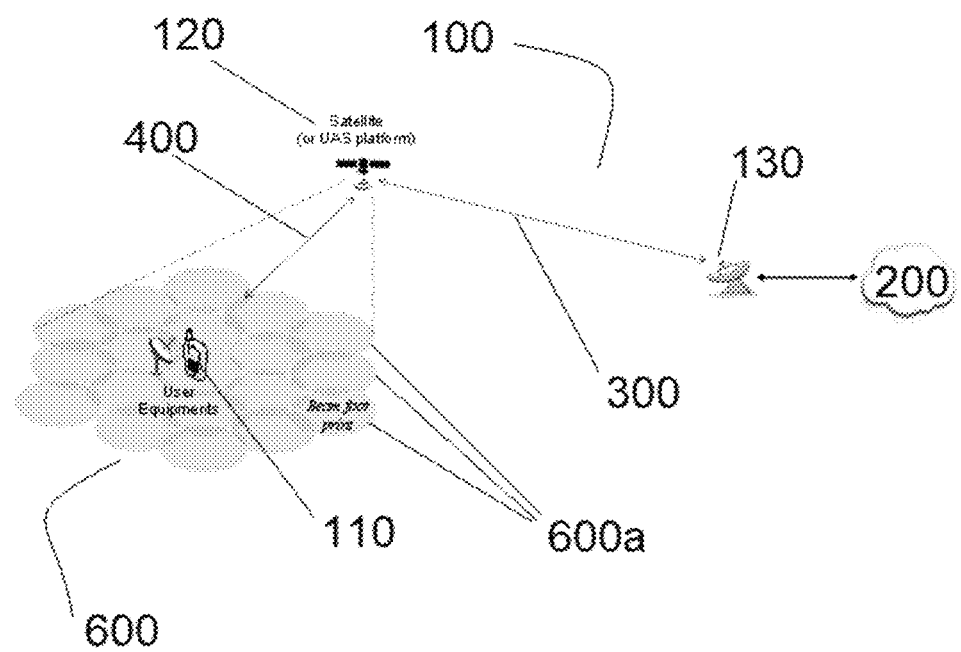

FIG. 1 illustrates schematically some main components of a typical Non-Terrestrial Network 100. In non-terrestrial network 100 communication service is provided to user equipment (UE) 110 via one or more satellites or UAS platforms 120. User data from a data network 200 is routed through an NTN gateway 130, located on the ground, and the satellite or UAS platform 120. Typically a wireless link between a satellite or UAS platform 120 and the NTN gateway 130 (NTN-GW) is referred to as a "feeder link" 300, and a wireless link 400 between a satellite and each UE is referred to as a "service link".

The satellite or UAS platform 120 may comprise a Low Earth Orbit (LEO) satellite which orbits the Earth at altitudes of between 500-1500 km. Each such LEO satellite may typically provide a NR service region 600 on Earth via one or more satellite beams which create NR cells in their beam footprint 600a. Due to their low altitude, such LEO satellites move relative to the Earth's surface with a speed about 7.5 km/s, and the NR service region 600 can be considered to be constantly scanning across a region of the surface of the Earth.

Figure 2:
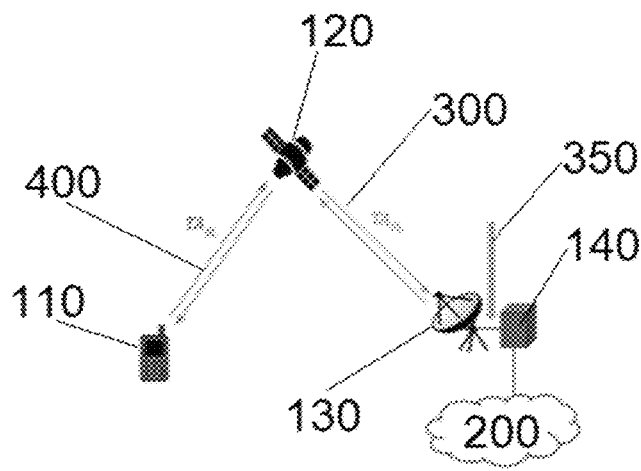
FIG. 2 illustrates schematically an example of an NTN system based on transparent architecture.

UE 110 operating in an NTN such as that shown schematically in FIG. 1 and FIG. 2, will have Global Navigation Satellite System (GNSS) support, meaning that the UE 110 will typically have access to what would normally be considered GNSS location and/or GNSS time. Provision of support for GNSS is that the UE needs to obtain an understanding of the time and frequency relationship between itself and any satellite forming part of the NTN Radio Access Network (RAN) in order to synchronize and remain synchronised.

FIG. 2 illustrates schematically an example of an NTN system based on transparent architecture. In one arrangement, a so-called "transparent" architecture of an NTN 100, a gNB 140 is located on the ground and the satellite 120 performs frequency conversion and signal amplification.

The NTN-GW 130 may be co-located with the gNB 130 or not. For example, the NTN-GW 130 may be located such that it can maintain a good link to the satellite 120, which may comprise a remote location at high altitude, whereas the gNB 140 including a baseband unit may be located such that it is easy to maintain and operate the gNB 140.

In such a scenario, signal propagation time between the gNB 140 and UE 110 includes the propagation time of both feeder link 300 and service link 400. A downlink (DL) signal from the network 200 received by the UE 110 will undergo a one-way propagation delay. If uplink (UL) frame timing is to be aligned with the DL frame timing at the gNB 140, the UE needs to apply a timing advance (TA) that is equal to the round-trip delay when transmitting such UL data. This TA adjustment must be accurate enough that the arrival time of an OFDM symbol is within the cyclic prefix window of the receiving gNB 140 in order to keep signals from multiple UE 110 from interfering with each other. In the arrangement shown in FIG. 2 where the gNB 140 is located on the ground, the delay 350 from NTN-GW 130 to gNB 140 contributes to the overall delay from UE 110 to the gNB 140.

It has been agreed that for NTN UEs 110 operating in particular connected states (RRC_IDLE, RRC_INACTIVE and RRC_CONNECTED) UE-specific TA calculation and frequency pre-compensation to counter Doppler shift experienced on the service link 400 based on GNSS-acquired position and serving satellite ephemeris is to be supported. The ephemeris information is typically provided to UE 110 via the gNB 140 in the System Information Block (SIB). The SIB from the gNB 140 supports two ephemeris formats, state vectors and orbital elements. Both ephemeris formats provide information regarding satellite location and a speed vector to the UE 110 at a given time.

A general formula for calculation of the Timing Advance (TA) applied by UE 110 has been agreed. Based on this agreement, the main components for calculation of the UE TA are:

Common TA ($N_{TA,common}$), which is provided by the network and is common to all UEs in the cell/beam, and UE-specific TA ($N_{TA,UE-specific}$), which is self-estimated by the UE (using GNSS and serving satellite ephemeris) and to account for the service link delay.

In general, it has been agreed that The Timing Advance applied by an NR NTN UE in RRC_IDLE/INACTIVE and RRC_CONNECTED is given by:

$$T_{TA} = (N_{TA} + N_{TA,UE-specific} + N_{TA,common} + N_{TA,offset}) \times T_c$$

Where:

$N_{TA}$ is defined as 0 for PRACH and updated based on TA Command field in msg2/msgB and MAC CE TA command.

For further study: details of $N_{TA}$ update/accumulation.

$N_{TA,UE-specific}$ is UE self-estimated TA to pre-compensate for the service link delay.

$N_{TA,common}$ is network-controlled common TA, and may include any timing offset considered necessary by the network.

$N_{TA,common}$ with value of 0 is supported.

For further study: details of signaling including granularity.

$N_{TA,offset}$ is a fixed offset used to calculate the timing advance.

Note-1: Definition of $N_{TA}$ is different from that in RAN1 #103-e agreement.

Note-2: UE might not assume that the Round Trip Time (RTT) between UE 110 and gNB 140 is equal to the calculated TA for Msg1/Msg A.

Note-3: $N_{TA,common}$ is the common timing offset X as agreed in RAN1 #103-e.

The agreement sets out, in particular, for $N_{TA,UE-specific}$ calculation and update a UE 110 will acquire satellite ephemeris (location and seed vector) in the SIB, obtain its own location information from GNSS and use its own propagator to predict its own UE-specific TA to be applied during a certain time period before acquiring new ephemeris data and/or GNSS information.

Similarly, the agreement sets out for $N_{TA,common}$ update, that so-called "assistance information" (Common TA and potentially Common TA drift rate and higher order derivatives of Common TA) will be broadcast in the SIB for all UEs 100 in the cell 600*a*.

The assistance information (Common TA and its derivatives) is broadcast and therefore common for all UEs 100 in the cell 600*a*, whereas UE-specific TA depends on the location of each UE.

It will be appreciated that the Common TA predominantly covers the feeder link 300 delay, whereas the UE-specific TA predominantly relates to the service link 400 delay. In most cases the feeder link 300 is assumed to be covered by the Common TA parameters which are provided from the gNB 140 to the UE 110 via broadcast signaling. In general, the gNB 140 may have some flexibility to determine the exact value of the Common TA, which means that the Common TA could cover part or a selected portion of the feeder link delay and allow a gNB 140 an ability to handle residual delay by performing pre- or post-compensation for DL and UL signals.

In practical terms, it will be appreciated that a maximum time during which a UE 110 will be able to apply the satellite ephemeris and/or assistance information for calculating TA, both UE-specific and/or Common TA, without having acquired new information will depend upon how long the calculated TA can fulfil UE requirements when being used for time synchronization.

Given the highly dynamic setup of a typical NTN, for example, in which LEO satellites are flying over the surface of the Earth where the UE are located with high velocity, UE will need to read SIB frequently in order to update ephemeris and Common TA. Since the NTN-GW 130 location is not known to the UE 110, the UE needs to acquire the assistance information (Common TA and potentially higher order derivatives of it) by reading the SIB, in order to update the $N_{TA,common}$. Knowing the gNB 140 location would allow the UE 110 to simplify various highly complex procedures relating to updating and tracking forward link delay based on SIB reading, and would allow for implementation at the UE of a less complex procedure. In any case, the NTN-GW 130 location is not known to the UE and the lack of co-location of gateway and gNB introduces delay 350 (see FIG. 2) and there is no plan for a network to provide the gNB and/or NTN-GW location to the UE directly due to security and privacy reasons in some countries.

As a result, if compared to a standard terrestrial radio access network, the need for frequent SIB updates represents an additional operational overhead for an NTN UE. In a terrestrial network, after initial access, the UE does not typically read the SIB very often, since reading the SIB is a complex procedure and largely unnecessary.

Arrangements recognise that a NTN UE 100 can operate in a better and smarter way than "only" reading the SIB in order to keep track of the highly dynamic Common TA and feeder link delay. Methods described below may be implemented in NTN UEs to enhance their performance. If implemented NTN UEs may be configured to operate such that there is a need to read the SIB less often to update the Common TA. Reading the SIB less often offers a route for NTN UE to save power and resources for and use such savings for computationally complex procedures.

Overview of Embodiments

Embodiments recognise that for system operation and signal processing carried out at a gNB 140, what is of key importance is the "overall" feeder link delay, namely from the satellite to the gNB (or eNB in case of Iot/eMTC over NTN). That overall feeder link delay will be referred to hereafter as "feeder link delay" and is split into two parts
  (i) The gNB 140 to NTN-GW 130 delay (represented as 350 in FIG. 2) which is semi-static
  (ii) The NTN-GW 130 to satellite 120 delay, which changes overtime depending on the current location of the satellite 120 and the location of the NTN-GW 130.

Embodiments recognise that if the UE 110 could acquire knowledge of the location of the NTN-GW 130 location (for example, coordinates on Earth), the additional information would allow the UE 110 to estimate and keep track over time of the delay between the satellite and the NTN-GW.

Arrangements further recognise that determining the gNB 140 to NTN-GW 130 delay can allow the UE 110 to track a full feeder link delay and thereby avoid a need to read a SIB frequently.

Depending on the structure of the SIB and how information is conveyed, UE may be configured such that it does not have to read an entire SIB. In particular, arrangements may be such that a UE does not have to decode the part of the SIB where, for example, the assistance information (for example, Common TA) is provided. The UE may only need to decode the part of the SIB where the serving satellite ephemeris is included.

The SIB may be structured such that separate portions of information cannot be independently extracted from the SIB, and, for example, all the assistance information data (for example, common TA, ephemeris) are indicated in the same SIB. In such an arrangement, the UE having knowledge of the NTN-GW location can facilitate simpler and more precise tracking of the feeder link delay.

Some embodiments recognise that a UE which has knowledge of previously acquired one or more NTN-GW location(s) can be useful. The knowledge of the previously acquired NTN-GW locations can be beneficial for the UE, since the UE may be configured to use such information to quickly obtain the feeder link delay, which may be of particular use, for example, in cases such as feeder link switch and/or cell handover.

Arrangements provide mechanisms which allow a UE to calculate an NTN-GW location and/or the gNB-GW delay. Those mechanisms are described in overview and then in more detail below.

SIB-Based Calculation

Figure 3:
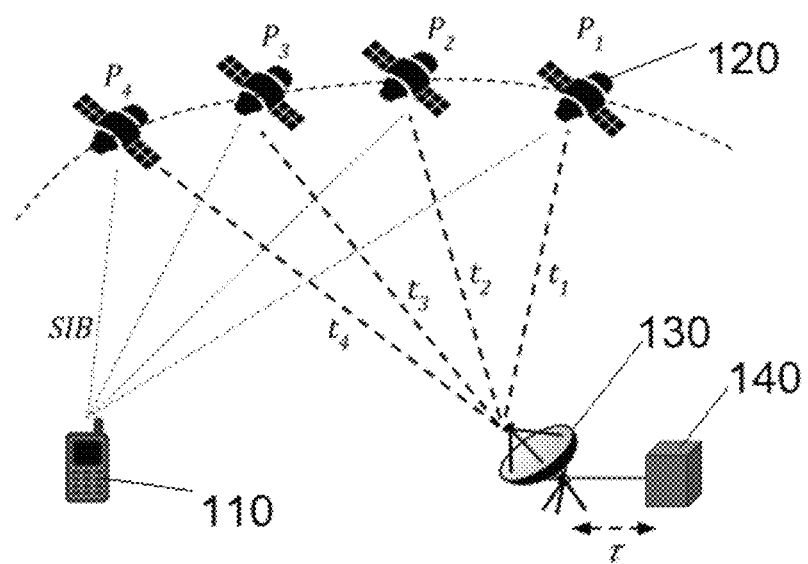
FIG. 3 illustrates schematically measurements and information of relevance to an example embodiment of the subject matter described herein.

FIG. 3 illustrates schematically measurements and information of relevance to an example embodiment of the subject matter described herein. In particular FIG. 3 illustrates how a SIB-based calculation of NTN-GW 130 location and delay T between NTN-GW 130 and the gNB 140 can be formulated. Using multiple measurements e.g. at time instants t=t1, t2, t3 and t4, when the satellite is in position p=p1, p2, p3, p4, allows a UE 110 to estimate the NTN-GW 130 coordinates {x, y, z} and the delay r between the NTN-GW 130 and the gNB 140.

In the case illustrated, there are 4 unknowns (x, y, z, τ) and so a UE is configured to read the SIB at least four times and solve the equation system to obtain the NTN-GW 130 coordinates {x, y, z} and the NTN-GW to gNB delay τ. In each SIB reading, the indicated value of Common TA is assumed to be equal to the sum of a round trip delay between the satellite 120 and NTN-GW 130 plus twice the (constant/ semi-static) delay T between the NTN-GW 130 and gNB 140.

Monitoring TAC (Timing Advance Command)

Timing Advance Command is a command sent to a UE to adjust its uplink transmission and informs the UE of the amount of time that it needs to advance its UL transmissions. A UE operating in an NTN can be configured to read TA Commands (TACs) and compares the delay from UE to NTN-GW based on a calculated or known NTN-GW location, with the TA value provided by the gNB. The difference is indicative of the NTN-GW to gNB delay τ. It will be appreciated that use of TAC to determine τ requires that the UE has some prior knowledge of the NTN-GW location, either from having directly calculated it from a series of SIBs, or by other means. Use of the TAC can be used to either estimate or refine a NTN-GW to gNB delay τ.

It will be appreciated that where a UE 110 has previously determined NTN-GWs locations available, it may be configured to perform an NTN-GW location hypothesis test, according to which it compares a broadcast Common TA in a SIB with the Common TA values corresponding to known NTN-GW locations.

Some arrangements are such that a UE can be provided with a list of known NTN-GW locations, which can be used for hypothesis testing. Such hypothesis testing includes estimates of the {x, y, z} of a NTN-GW and potential delay τ between NTN-GW and the actual gNB within a system. A location list may be provided as a pre-configuration for the client device, for example, UE, NB-IoT device or eMTC device; through Universal Subscriber Identity Module (USIM); and/or via network updates based on connected mode updates of an internal database in the client device. Knowledge of potential NTN-GW locations can significantly assist the UE in estimating coordinate sets to use. It will be appreciated that in the case where only one NTN-GW location combined with the serving satellite ephemeris matches provided Common TA parameters, it is a simple matter of validation.

Whilst solving a system of N equations to calculate a set of N unknowns is a standard method, use of SIB specific content (common delay and derivatives) as an input for such a calculation and modelling the overall link delay as a two-component sum allows the UE to operate such that it does not need to constantly read a SIB. Furthermore, the approach can be validated at the UE in implementations in which hypothesis testing is performed against prior knowledge and other locations of gNBs, and/or by combining results of calculations with a separate TA command provided by gNB. Such approaches allow for an overhead reduction at a UE and release resource and energy for other applications.

Example 1: SIB-Based Calculation

Figure 4:
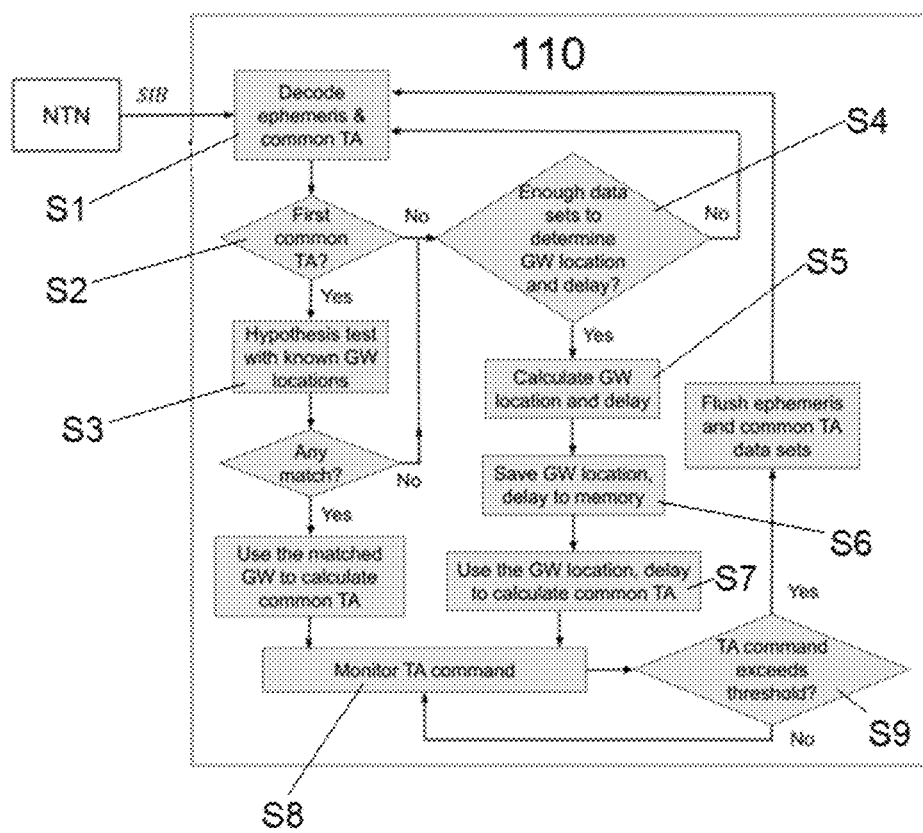
FIG. 4 illustrates schematically operation of a device in accordance with an example embodiment of the subject matter described herein.

FIG. 4 illustrates schematically operation of a device in accordance with an example embodiment of the subject matter described herein.

The procedure which a UE follows according to one arrangement is explained in following steps in more detail:

As shown in FIG. 4, the UE 110 is configured at step S1 to read a SIB message and acquire serving satellite 120 ephemeris (location information and speed vector of the serving satellite). The UE can also obtain one or more parameters related to the feeder link delay from the SIB, for example, Common TA and derivatives of it.

In a case in which the UE 110 has prior knowledge of one or more NTN-GW locations, for example, as a result of previously determined NTN-GW locations it has calculated, the UE can be configured to perform and NTN-GW hypothesis test at step S2, according to which it compares the broadcast feeder link delay values in the SIB (for example, Common TA), with values corresponding to pre-known NTN-GW locations. If a known NTN-GW location is found to match these values, the UE considers at step S3 this NTN-GW location for further calculation and tracking the corresponding satellite to NTN-GW as well as the NTN-GW to gNB delays. If there is no match between values broadcast in the SIB and the list of known NTN-GW locations, the UE can proceed to obtain information to allow direct calculation of the NTN-GW location.

To do so, the UE acquires at step S4 multiple SIB messages to determine at step S5 the NTN-GW location and the delay between NTN-GW and gNB, based on the example configuration as shown in FIG. 3.

To determine (x, y, z) and τ, the UE acquires the SIB (at least) four times. In this way, the values of four satellite positions $\{P_i\}_{i=1,2,3,4}$ and four Common TA values $T_{AC,i}=\{2(\Delta t_i+T)\}_{i=1,2,3,4}$ are acquired by reading the SIB at time instants $t=t_1, t_2, t_3$ and $t_4$, respectively. This corresponds to the standard case where the gNB configures the Common TA value in such way to cover the delay between the satellite and the gNB.

This information can be used by the UE to calculate the unknown NTN-GW coordinates {x, y, z} and, having calculated {x, y, z} to calculate the NTN-GW to gNB delay τ.

The UE acquires four SIB messages at time instants $t=t_1, t_2, t_3$ and $t_4$, reads ephemeris information and Common TA related parameters at each of these points in time and acquires satellite coordinates $\{x_s, y_s, z_s\}_{t=t1, t2, t3\ and\ t4}$, respectively.

In what follows, parameter Δt denotes the propagation delay time between satellite 120 and NTN-GW 130, and varies with time, whereas Δt+τ is the delay from the gNB 140 to the satellite at time t, and is provided to the UE via Common TA (and related parameters as the time derivatives of it).

For the first time instant $t=t_1$ we have $$T_{AC,1}/2-\tau=t_1 =>$$

$$T_{AC,1}/2-\tau=\text{sqrt}\{(x_s(t_1)-x)^2+(y_s(t_1)-y)^2+(z_s(t_1)-Z)^2\}/ \quad (1)$$

In equation (1), the set of $\{x_s(t_1), y_s(t_1), z_s(t_1)\}=\{x_s, y_s, z_s\}t=t_1$ and Common TA value $T_{AC,1}$ is by ephemeris, at time t=t1. The distance between NTN-GW and satellite at time t is given by: sqrt $\{(x_s(t)-x)^2+(y_s(t)-y)^2+(z_s(t)-z)^2\}$, where c denotes the speed of light.

In a similar way, for time instants $t=t_2, t_3$ and $t_4$, we have $$T_{AC,2}/2-\tau=\text{sqrt}\{(x_s(t_2)-x)^2+(y_s(t_2)-y)^2+(z_s(t_2)-z)^2\}/c \quad (2)$$

$$T_{AC,3}/2-\tau=\text{sqrt}\{(x_s(t_3)-x)^2+(y_s(t_3)-y)^2+(z_s(t_3)-Z)^2\}/c \quad (3)$$

$$T_{AC,4}/2-\tau=\text{sqrt}\{(x_s(t_4)-x)^2+(y_s(t_4)-y)^2+(z_s(t_4)-z)^2\}/c \quad (4)$$

From the four equations (1) to (4), the UE 110 can to solve this system of equations and calculate the unknown coordinates {x, y, z} and the unknown NTN-GW to gNB delay τ.

Taking more measurements at other points in time can provides further information and equations to the UE and allows for solving the system with potentially higher accuracy.

A special case occurs when an NTN-GW to gNB delay is directly indicated to the UE by the network, for example, through parameter Kmac (defined in the 3GPP standards—see Rel-17 TS 38.213). In this special case, the NTN-GW to gBN delay is given by T=Kmac*Tslot, as indicated via parameter Kmac to the UE and is known to the UE from the first SIB reading, at least with an accuracy of one slot (depending on the definition of Kmac, this parameter value may alternatively correspond to twice of the NTN-GW delay; in this case Kmac/2 is used). This corresponds to the case where the so-called "Time Reference Point" (the location where DL-UL frames align in time) is located at the NTN-GW. This means that the UE needs to pre-compensate for the delay from the UE to NTN-GW only, and the NTN-GW to gNB delay is not relevant for the UE to be considered in TA calculation. In this special case, only three unknown parameters need to be calculated, namely the NTN-GW coordinates {x, y, z}, and therefore only three SIB readings are required to provide a solvable system of equations. In the special case, equations (1)-(3) above can be written as:

$$T_{AC,1}/2 - \text{Kmac}*T\text{slot} = \text{sqrt}\{(x_s(t_1)-x)^2 + (y_s(t_1)-y)^2 + (z_s(t_1)-z)^2\}/c \quad (5)$$

$$T_{AC,2}/2 - \text{Kmac}*T\text{slot} = \text{sqrt}\{(x_s(t_2)-x)^2 + (y_s(t_2)-y)^2 + (z_s(t_2)-z)^2\}/c \quad (6)$$

$$T_{AC,3}/2 - \text{Kmac}*T\text{slot} = \text{sqrt}\{(x_s(t_3)-x)^2 + (y_s(t_3)-y)^2 + (z_s(t_3)-z)^2\}/c \quad (7)$$

Solving equations (5)-(7) provides NTN-GW coordinates {x, y, z}. Again, taking more measurements at other points in time provides further information and equations to the UE and allows for solving the system with potentially higher accuracy.

Having calculated the NTN-GW location, the UE stores the GW location and delay at least to local memory at step S6.

The UE is configured the then use at step S7 the determined NTN-GW location to calculate the Common TA at future time instants without having to periodically read common TA related assistance information from the SIB.

In order to keep the Common TA up-to-date, the UE would normally need to read SIB often to obtain the latest update on Common TA value provided by the gNB. Having now gained knowledge on the NTN-GW location, and having read the satellite ephemeris (also provided via SIB), the UE can calculate the satellite-to-NTN GW delay.

The quasi-static component of delay between NTN-GW to gNB can be then added, in order to obtain to full delay from satellite to gNB.

For example, having estimated NTN-GW coordinates {x, y, z} according to the above method and having obtained from ephemeris the satellite coordinates $\{x_s, y_s, z_s\}_{t=0}$ at time t=0, it is possible to calculate propagation time between satellite and NTN-GW ($\Delta t$). In this case, this delay is given by $\Delta t = s_{FL}(t)/c$, where $s_{FL}(t)$ is the Euclidean distance between satellite and NTN-GW at time t and is given by:

$$s_{FL}(t) = \text{sqrt}\{(x_s(t)-x)^2 + (y_s(t)-y)^2 + (z_s(t)-Z)^2\}$$

where c denotes the speed of light and "sqrt" is used for the root square operator.

Using the information of satellite speed vector $v = \{v_x, v_y, v_y\}_{t=0}$ as provided by satellite ephemeris for t=0, the coordinates $\{x_s, y_s, z_s\}_t$ of the satellite's location can, for example, be calculated for any time t according to:

$$\{x_s, y_s, z_s\}_t = \{x_s, y_s, z_s\}_{t=0} + \{v_x, v_y, v_y\}_{t=0} * t \quad (8)$$

The delay between satellite and gBN is given by the sum $\Delta t + \tau$, where $\tau$ is the quasi-static delay between NTN-GW and gNB, which can be estimated or provided by the network.

Equation (8) uses a simple linear approximation of the satellite's orbit, it will be appreciated that a more advanced polynomial approximation could also be applied.

According to some implementations the UE may be configured to stores the determined NTN-GW location and NTN-GW to gNB delay in its local memory.

According to some implementations, whenever the UE connects or attempts to connect to a new satellite as part of initial access or handover, the UE may be configured to try to validate the common TA in a received SIB with a list of information about known NTN-GWs (location, delay) stored in its local memory. If a match with the Common TA in SIB is found, the UE can be configured to use this NTN-GW location value and delay as a basis to further calculate or refine the Common TA and NTN-GW location and/or NTN-GW to gNB delay.

It will be appreciated that if information provided by Common TA is highly accurate at the time of its validity, the UE will be able to use this for estimating the NTN-GW location with high accuracy. The satellite location information is provided by the satellite to the gNB. The satellite location forms the basis on which the gNB calculates the Common TA. It has been agreed that such information provided by a satellite should be at least accurate with an accuracy of 50 m. Considering a typical LEO satellite speed of 7.5 km/s, SIB measurements separated in time by 1 s would correspond to satellite locations separated by 7.5 km, which much higher than any possible error in the provided information.

Example 2: Monitoring TAC (Timing Advance Command)

The procedure which a UE follows according to one arrangement to validate or check the location information and NTN-GW to gNB delay is explained in following steps in more detail:

The UE is configured to read or monitor TA Commands (TACs) at step S8 and can be configured to compare at step S9 a delay from UE to NTN-GW based on a "known" NTN-GW location, with the TA value provided by the gNB. The difference provides the NTN-GW to gNB delay.

Use of the TAC to validate information known to the UE requires that the UE has some prior knowledge of the NTN-GW location, either as a result of direct calculation or by other means. Use of the TAC allows the UE to estimate and/or refine the NTN-GW to gNB delay.

According to some implementations, if the TAC exceeds a certain threshold, or keeps exceeding a selected value over a predetermined period of time, it can be indicative that the UE autonomous calculation of Common TA based on the NTN-GW location is erroneous and the UE needs to read SIB again to update the assistance information (Common TA and derivatives).

Arrangements recognise that having a knowledge of gNB and NTN-GW location can allow the UE to simplify its procedures in relation to the updating and tracking of forward link delay. Since it has been agreed that a network will not provide the gNB and/or NTN-GW location to the UE, due to security and privacy reasons in some countries, methods described above provide a mechanism by which a UE is operable to calculate or obtain information which can assist its ongoing operation and reduce an ongoing need to decode SIB in support of calculation of an appropriate Uplink TA.

In other words, an NTN UE configured to perform in accordance with described arrangements can to do better than needing to regularly read the SIB to provide an appropriate TA calculation. An NTN UE operating in accordance with a described methodology need not always read the SIB, at least the part carrying the assistance information (Common TA and derivatives). To apply an appropriate TA in the uplink, a UE operating in accordance with described methodologies will adjust the TA value in a way based on UE and the NTN-GW location, following fully the expected movement of a satellite on an orbit.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

As used in this application, the term "circuitry" may refer to one or more or all of the following:
(a) hardware-only circuit implementations (such as implementations in only analog and/or digital circuitry) and
(b) combinations of hardware circuits and software, such as (as applicable):
(i) a combination of analog and/or digital hardware circuit(s) with software/firmware and
(ii) any portions of hardware processor(s) with software (including digital signal processor(s)), software, and memory(ies) that work together to cause an apparatus, such as a mobile phone or server, to perform various functions) and
(c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device or node, or other computing or network device or node.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. An apparatus, comprising:
   at least one processor; and
   at least one memory including computer program code, the at least one memory and computer program code being configured to, with the at least one processor, cause the apparatus to:
   receive an indication of propagation delay between a terrestrial network node and a non-terrestrial node in a non-terrestrial wireless communication network;
   receive an indication of location of the non-terrestrial node;
   evaluate location of the terrestrial network node in dependence upon the received indication of propagation delay between the terrestrial network node and the non-terrestrial node, and the indication of location of the non-terrestrial node,
   wherein the terrestrial network node comprises: a non-terrestrial network gateway which is coupled to a network base station remote from the non-terrestrial network gateway and wherein the apparatus is further caused to:
   determine a signal delay between the network base station and the non-terrestrial network gateway.

2. The apparatus according to claim 1, wherein evaluating location of the terrestrial network node comprises: comparing the received indication of propagation delay between the terrestrial network node and the non-terrestrial node with an equivalent indication of propagation delay between the terrestrial network node and non-terrestrial node calculated based upon the received indication of location of the non-terrestrial node and one or more stored locations of terrestrial network nodes.

3. The apparatus according to claim 1, wherein receiving the indication of propagation delay between the terrestrial network node and the non-terrestrial node comprises receiving at least three indications of propagation delay; and
   wherein receiving the indication of location of the non-terrestrial node comprises receiving at least three indications of location of the non-terrestrial node which correspond to an associated received indication of propagation delay between the terrestrial network node and the non-terrestrial node;
   and wherein evaluating location of the terrestrial network node comprises calculating the location of the terrestrial network node from the at least three received indications of propagation delay between the terrestrial network node and the non-terrestrial node, and the corresponding at least three indications of location of the non-terrestrial node.

4. The apparatus according to claim 1, wherein determining the signal delay between the network base station remote from the non-terrestrial network gateway comprises receiving an indication of that signal delay from the network.

5. The apparatus according to claim 1, wherein the indication of propagation delay between the terrestrial network node and the non-terrestrial node comprises an indication of signal delay between the network base station and the non-terrestrial node; and evaluating location of the terrestrial network node is dependent upon the received indication of distance between the terrestrial network node and the non-terrestrial node and the indication of location of the non-terrestrial node comprises evaluating the signal delay between the network base station and the coupled non-terrestrial network gateway.

6. The apparatus according to claim 1, wherein said at least one memory and computer program code are configured to, with said at least one processor, cause the apparatus to:
store the calculated location of the terrestrial network node.

7. The apparatus according to claim 1, wherein said at least one memory and computer program code are configured to, with said at least one processor, cause the apparatus to:
assess a terrestrial network node to non-terrestrial node signal propagation delay based upon the evaluated location of the terrestrial network node and received indication of location of the non-terrestrial node.

8. The apparatus according to claim 1, wherein aid at least one memory and computer program code are configured to, with said at least one processor, cause the apparatus to:
receive an indication of required timing advance to be applied according to network calculation;
compare the received indication of required timing advance to a local calculation of timing advance based upon the evaluated location of the terrestrial network node, and wherein the comparison provides an indication of signal delay between the network base station coupled to the non-terrestrial network gateway.

9. The apparatus according to claim 8, wherein said at least one memory and computer program code are configured to, with said at least one processor, cause the apparatus to:
compare the indication of signal delay between the network base station coupled to the non-terrestrial network gateway with a calculated signal delay between the network base station coupled to the non-terrestrial network gateway.

10. The apparatus according to claim 9, wherein if the comparison reveals a difference which exceeds a predetermined threshold, initiation of a recalculation of location the terrestrial network gateway is triggered.

11. A method, comprising:
receiving an indication of propagation delay between a terrestrial network node and a non-terrestrial node in a non-terrestrial wireless communication network, wherein the terrestrial network node comprises: a non-terrestrial network gateway which is coupled to a network base station remote from the non-terrestrial network gateway;
determining a signal delay between the network base station and the non-terrestrial network gateway;
receiving an indication of location of the non-terrestrial node; and
evaluating location of the terrestrial network node in dependence upon the received indication of propagation delay between the terrestrial network node and the non-terrestrial node and the indication of location of the non-terrestrial node.

12. The method according to claim 11, wherein evaluating location of the terrestrial network node comprises: comparing the received indication of propagation delay between the terrestrial network node and the non-terrestrial node with an equivalent indication of propagation delay between the terrestrial network node and non-terrestrial node calculated based upon the received indication of location of the non-terrestrial node and one or more stored locations of terrestrial network nodes.

13. The method according to claim 11, wherein:
receiving the indication of propagation delay between the terrestrial network node and the non-terrestrial node comprises receiving at least three indications of propagation delay; and
wherein receiving the indication of location of the non-terrestrial node comprises receiving at least three indications of location of the non-terrestrial node which correspond to an associated received indication of propagation delay between the terrestrial network node and the non-terrestrial node;
and wherein evaluating location of the terrestrial network node comprises calculating the location of the terrestrial network node from the at least three received indications of propagation delay between the terrestrial network node and the non-terrestrial node, and the corresponding at least three indications of location of the non-terrestrial node.

14. The method according to claim 11, wherein determining the signal delay between the network base station remote from the non-terrestrial network gateway comprises receiving an indication of that signal delay from the network.

15. The method according to claim 11, wherein the indication of propagation delay between the terrestrial network node and the non-terrestrial node comprises an indication of signal delay between the network base station and the non-terrestrial node; and evaluating location of the terrestrial network node is dependent upon the received indication of distance between the terrestrial network node and the non-terrestrial node and the indication of location of the non-terrestrial node comprises evaluating the signal delay between the network base station and the coupled non-terrestrial network gateway.

16. The method according to claim 11, comprising:
storing the calculated location of the terrestrial network node.

17. The method according to claim 11, comprising:
assessing a terrestrial network node to non-terrestrial node signal propagation delay based upon the evaluated location of the terrestrial network node and received indication of location of the non-terrestrial node.

18. The method according to claim 11, comprising:
receiving an indication of required timing advance to be applied according to network calculation;
comparing the received indication of required timing advance to a local calculation of timing advance based upon the evaluated location of the terrestrial network node, and wherein the comparison provides an indication of signal delay between the network base station coupled to the non-terrestrial network gateway.

19. The method according to claim 11, comprising:
comparing the indication of signal delay between the network base station coupled to the non-terrestrial network gateway with a calculated signal delay between the network base station coupled to the non-terrestrial network gateway.

20. A non-transitory computer-readable medium storing computer program code including instructions that, when executed by a processor, cause apparatus to:
- receive an indication of propagation delay between a terrestrial network node and a non-terrestrial node in a non-terrestrial wireless communication network wherein the terrestrial network node comprises: a non-terrestrial network gateway which is coupled to a network base station remote from the non-terrestrial network gateway;
- determine a signal delay between the network base station and the non-terrestrial network gateway;
- receive an indication of location of the non-terrestrial node; and
- evaluate location of the terrestrial network node in dependence upon the received indication of propagation delay between the terrestrial network node and the non-terrestrial node and the indication of location of the non-terrestrial node.

* * * * *